C. H. PETERSON.
WHEEL.
APPLICATION FILED JULY 30, 1917.

1,319,657.

Patented Oct. 21, 1919.
2 SHEETS—SHEET 1.

Inventor
C. H. Peterson
By Hurst Sutherland
Attorney

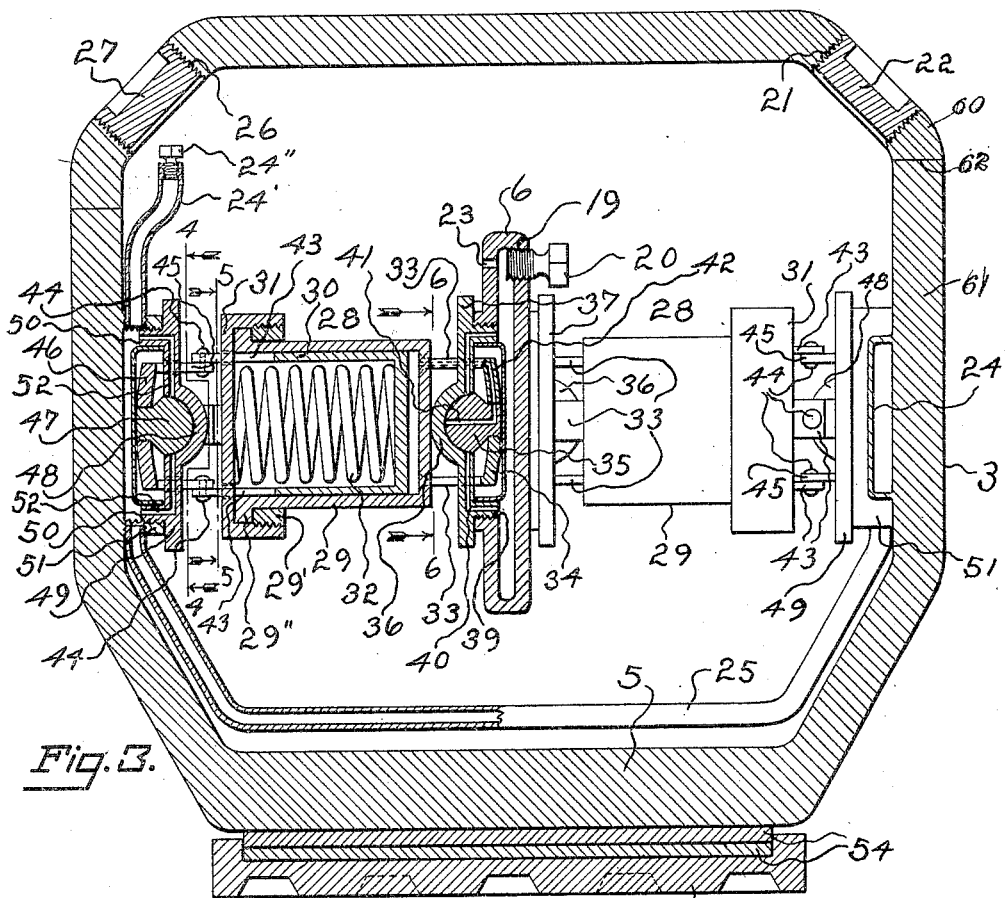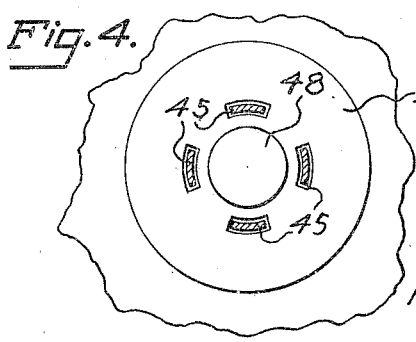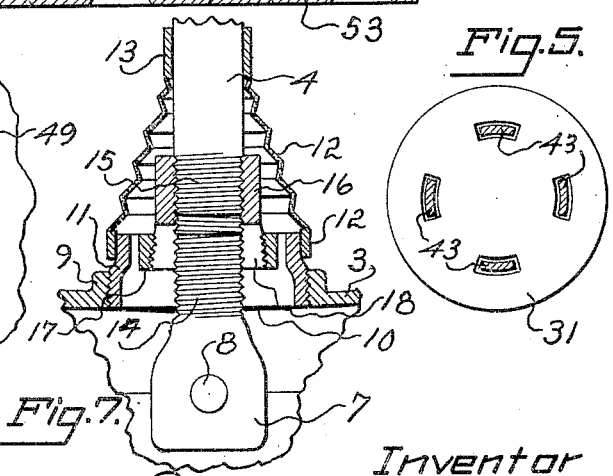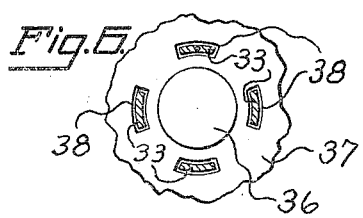

UNITED STATES PATENT OFFICE.

CHARLES H. PETERSON, OF HARTFORD, CONNECTICUT.

WHEEL.

1,319,657.  Specification of Letters Patent.  Patented Oct. 21, 1919.

Application filed July 30, 1917. Serial No. 183,385.

*To all whom it may concern:*

Be it known that I, CHARLES H. PETERSON, a citizen of the United States, residing at Hartford, in the county of Hartford and State of Connecticut, have invented certain new and useful Improvements in Wheels, of which the following is a specification.

This invention relates to wheels. Obviously a wheel comprising the invention is capable of employment in widely different fields, although it is of particular advantage, however, when incorporated for illustration in an automobile. The primary feature of the invention is to provide a wheel having the requisite strength and rigidity, yet involving the necessary resiliency and the ability to withstand shocks such as occur in the starting and stopping of vehicles and while they are traveling heavily loaded or otherwise. Another equally important object I have in view is the provision for the proper and ample lubrication of the moving parts. There are other features of novelty and advantage, which with the foregoing will be set forth in the following description, wherein I will outline in detail that form of embodiment of the invention which I have selected for illustration in the drawings accompanying and forming part of the present specification. This disclosure is to enable those skilled in the art to practice the invention. I may depart therefrom in several respects within the scope of the invention defined by the claims following said description.

Referring to said drawings:

Fig. 3 is a section on the line 3—3 of Fig. 1, looking in the direction of the arrow, a portion, however, being in elevation.

Figure 1:
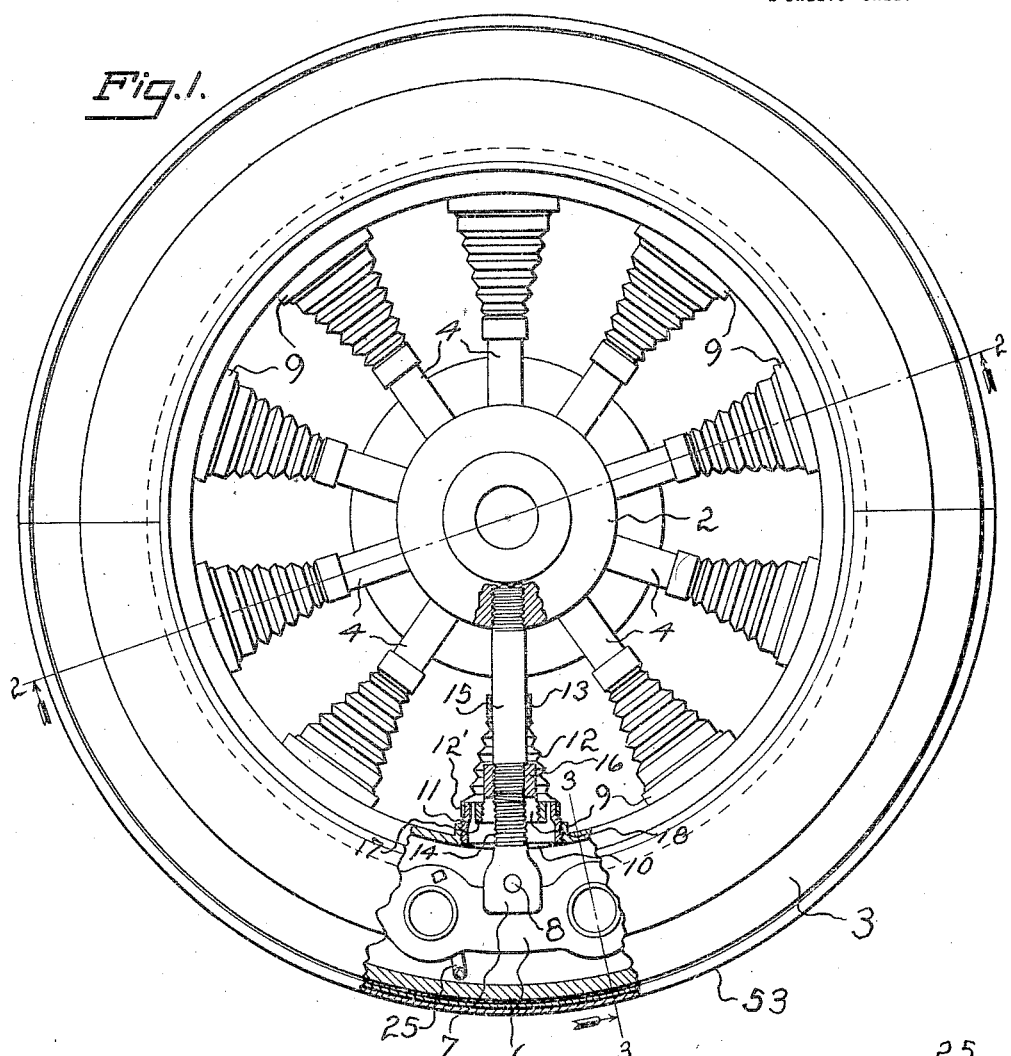
Figure 1 is a side elevation partly in section with a portion broken away, of a wheel involving the invention.

Fig. 4, 5 and 6 are cross sections on the lines 4—4, 5—5 and 6—6 of Fig. 3, looking in the direction of the arrows respectively.

Fig. 7 is a detail in longitudinal section of the outer portion of a spoke, portion of the rim and coacting parts.

Like characters refer to like parts throughout the several views which are on different scales.

The wheel has a hub as 2, a tire as 3 and spokes as 4. There may be any suitable number of these spokes. As shown their inner ends are tapped or threaded into the hub 2. The tire 3 as will hereinafter appear is of composite construction, the several elements thereof being generally made from sheet metal. The hub 2 may also be of metal, while the same observation applies to the spokes. The material from which, however, any element is constructed is not always a matter of consequence, although the parts are desirably made from metal which in fact I prefer to use. Although the spokes 4 are directly connected with the hub 2, they are not similarly associated with the tire 3 as I will hereinafter describe.

The tire 3 is in the form of a hollow circular body which as shown is practically octagonal in cross section, the peripheral face of the tire being thickened as at 5 to constitute the tread portion of the tire. Inside the hollow tire 3 is a circular floating member as 6. To this bodily movable or floating circular member 6 are connected suitably the several spokes 4. As shown the spokes extend through the inner portion of the tire 3 and are forked as at 7 to straddle the annular floating member 6, which it will be observed is about in the center of the tire 3. The spokes 4 as shown are pivoted to the floating member 6 by bolt 8. The tire 3 has on its inner side the circular flanges 9 extending from the circular openings 10, the walls of the openings and the inner side of the flanges being threaded to receive the bands 11 which are connected by bellows-like members 12 with the rings 13 slidable longitudinally of the respective spokes, it being understood that each spoke is surrounded by a bellows-like part 12. The outer or large ends of the bellows-like parts are furnished with rings 12' fitted around the reduced portions of the bands 11. These bellows-like parts 12 constitute dust protectors to prevent the entrance of dust and other foreign matters into the inside of the hollow tire 3.

Each spoke 4 consists of two co-radial parts 14 and 15, the part 14 as shown being directly connected with the annular member 6, and the part 15 to the hub 2 as already set forth. These parts 14 and 15 have their adjacent ends separated or spaced as shown best in Figs. 1 and 7. They are also threaded near their adjoining ends to receive the nuts 16 which are externally threaded and tapered to receive the rings 17.

The tapered parts of the nuts 16 are slotted or split as at 18 at their outer ends, the rings 17 as will be understood being in threaded engagement with the split parts of the respective nuts. On turning the rings 17, the nuts will be caused to bind on the sections of the respective spokes.

The annular floating member 6 to which it will be remembered the spokes 4 are connected, is hollow to receive lubricant, and this can be supplied to said part 6 through the opening 19 by the removal of the plug 20, access to which is had through the opening 21 in the hollow tire 3 by removing the plug 22. When the necessary amount of oil or other lubricant has been introduced into the part 6, the two plugs 22 and 20 respectively will be put back into place. The opening 21 is made of sufficient size to provide for proper access to the plug 20 to effect removal and insertion thereof. The manner in which the oil flows from the annular hollow member 6 to supply certain wearing surfaces will be hereinafter pointed out. The annular oil containing and spoke connectible member 6 has in addition to the lubricant introducing opening 19 a vent hole 23.

In the interior of the tire 3 and upon the side walls thereof practically diametrically opposite each other are the circular duct members 24 which are connected to each other as shown by a channel or tube as 25. In the present case lubricant of suitable character is supplied to one of these duct members, as that on the left in Fig. 3 as hereinafter set forth and which is conducted by the tube 25 to the complemental duct member on the opposite side of the tire. The lubricant may be supplied to the duct members 24 in any desirable way as through the filling opening 26 which is normally closed by the screw plug 27. Connected with and extending inwardly from the duct member 24 is a tube 24' having a removable plug 24" adjacent the plug 27. By taking out this screw plug 27 and then the plug 24" lubricant or other suitable substance can be supplied to the tube 24 from which it flows to the duct member 24 on the left and then by way of the tube 25 to the companion duct member 24 on the right.

Between the annular floating member 6 and the tire 3 are disposed shock absorbing or buffing elements such as those denoted in a general way by 28 and shown best in Fig. 3. These shock absorbing or buffing elements 28 are arranged in pairs as will be understood, the members of the respective pairs being coaxial. Each member 28 extends from the part 6 to the tire 3 and is longitudinally extensible and contractible. I will describe in detail one of the elements, it being clear that such a detailed description applies to the others, they being as shown of similar construction. I might note that each element 28 is connected at its terminals with the parts 6 and 3, each end connection being in the present case by a universal joint. Not only do I provide for the adequate lubrication of each universal joint, but I also provide the same with regard to each shock absorbing or buffing element or connector 28.

Each element 28 comprises a body or cup part as 29 connected as I will hereinafter point out, by a universal joint to the annular member 6, a piston part 30 and a head 31, the head as shown being threaded onto the ring 29' abutting against the flange 29" near the open end of the body part 29. The piston 30 incloses the coiled spring 32 bearing at one end against the closed forward end of the piston part 30 and at its other against the cap 31. As will be understood the piston part 30 has a sliding fit in the cup 29. The piston 30 as I will hereinafter point out has a universal connection with the tire 3. The inner closed end of the cup or casing 29 has extending from it the arms 33, four of said arms being shown and being connected at their inner ends by the crown piece 34 to which the shank of the ball member 35 is connected, said ball member having a rocking connection with the socket member 36 which has a spherical seat to receive the ball member 35. The spherical seat is formed in the plate 37 which is slotted as at 38 for the passage of the four arms 33. This plate 37 is provided with an annular flange 39 threaded into an opening in the adjacent side of the annular member 6. The plate 37 and flange 39 have as shown a right angular port or passage 40, leading from the inner edge of the flange 39 to the socket or spherical portion 36 so as to lubricate the ball or spherical portion 35, the oil obviously flowing from the chamber or space of the annular member 6. The result is that the ball and socket connection can run freely, being constantly lubricated. The ball or spherical member 36 as shown has a port 41 extending from the outer surface of the center thereof and to receive oil or other lubricant. This port 41 is connected with a coöperating port 42 formed in the cap 34 and also in one of the arms 33, the port 42 extending the entire length of the arm 33 and opening into the interior of the shell or casing 29 so as to conduct lubricant into the latter.

The piston member 30 as shown is provided with arms 43 extending outward therefrom, there being as shown four of such arms pivoted as at 44 to practically similar arms 45 extending from the dished plate 46 to the center of which is connected the shank of the ball or sphere member 47 coöperative with the socket member 48 from which extends the plate 49 having the flange 50 threaded into the flange 51 on the duct member 24. The plate or disk 49 and the flange 50 connected therewith have a channel or duct 52 extending from the interior of the duct member 24 to the inside of the socket 48 to thus lubricate the socket and hence the ball or spherical member 49. As a result of this both points or connection of the shock absorbing or buffing element 28 are adequately and thoroughly lubricated.

The tire 3 may have its outer portion surrounded by the non-skid shoe 53 and between the said shoe which is generally roughened on its outer surface and the tire, I may interpose the bands 54 one of which may be of rubber or other suitable elastic or shock-absorbing material.

Figure 2:
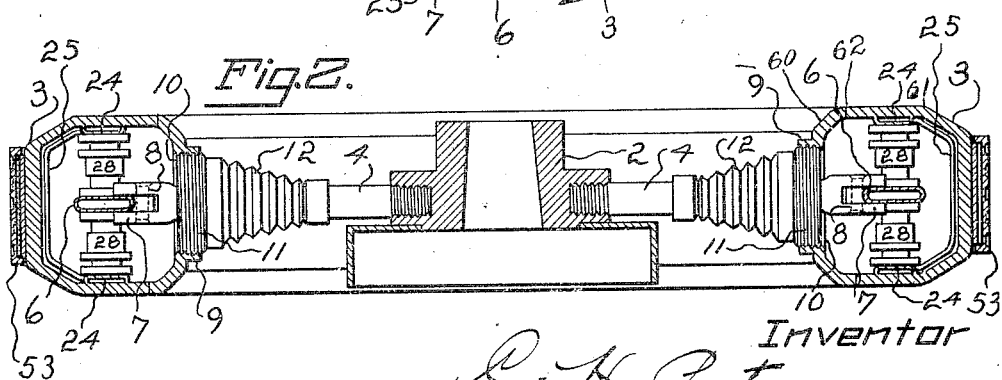
Fig. 2 is a section on the line 2—2 of Fig. 1, looking in the direction of the arrows.

The tire 3 is initially made in two sections as 60 and 61. In the section 60 is first mounted the circular floating member 6 which is connected with opposite sides of said section 60 by the shock absorbing or buffing elements 28. When this is accomplished the section 61 is fitted to the section 60 by a relative lateral motion thereof, and the two parts 60 and 61 are then united as by welding along the lines 62. The tire 3 as will be clear has holes 10 in the section 61 thereof and through these holes the hand or hands may be introduced to connect the spokes 4 with said floating member 6, all as shown in Figs. 2 and 3.

What I claim is:

1. The combination of a hub, a hollow tire, spokes connected with the hub and extending into the tire, an annular member in the tire and to which the spokes are connected, members flexibly jointed to the annular member and tire respectively, and means for automatically lubricating said members at their joints.

2. The combination of a hub, a hollow tire, spokes connected with the hub and extending into the tire, an annular member in the tire and to which the spokes are connected, and members jointed to the annular member and tire respectively for relative universal movement, and means for automatically lubricating the joints of said members.

3. A wheel comprising a hollow tire, an annular member in the tire provided with means for the connection of spokes thereto, members flexibly jointed to the annular member and tire respectively, and means for automatically lubricating said members at their joints.

4. A wheel comprising a hollow tire, an annular member in said tire, members flexibly jointed to the annular member and tire respectively and having sections connected with each other for elongation and contraction, and means for automatically lubricating the members between their joints and for also lubricating the sections thereof.

5. The combination of a hub, a hollow tire, spokes rigidly connected with the hub, the tire having flanged openings through which the spokes extend, an annular member in the tire and to which the spokes are connected, members flexibly jointed to the annular member and tire respectively, sleeves threaded into the flanged openings, bellows-like dust-excluding elements having rings at their terminals, one ring of each being fitted about a band and the other about a spoke.

6. The combination of a hub, a hollow tire, spokes rigidly connected with the hub, the tire having flanged openings through which the spokes extend, an annular member in the tire and to which the spokes are connected, members flexibly jointed to the annular member and tire respectively, sleeves threaded into the flanged openings, bellows-like dust-excluding elements having rings at their terminals, one ring of each being fitted about a band and the other about a spoke, each of the spokes consisting of threaded coaxial sections, a nut threaded onto the sections and having a tapered threaded slit portion, and a ring threaded onto said threaded tapered slit portion.

7. The combination of a hub, a hollow tire, spokes connected with the hub and extending into the hollow tire, an annular hollow member in the tire and to which the spokes are connected, members flexibly jointed to the annular hollow member, the tire having ducts on its inner side to which the said members are also flexibly jointed, and means for supplying lubricant to the annular hollow member and to the annular duct members, both the annular member and the hollow duct members having means for the supply of the lubricant to the joints of said members.

8. The combination of a hub, a tire, an annular member surrounded by the tire, spokes connected with the hub and with the annular member, members jointed to the annular member and tire respectively, and means for automatically lubricating the joints of said members where they are connected with the annular member and tire respectively.

9. The combination of a hub, a tire, spokes connected with the hub, an annular member surrounded by the tire and to which the spokes are connected, and longitudinally adjustable shock absorbing members jointed to the annular member and tire respectively for relative universal movement, and means for automatically lubricating the joints of said members with said annular member and tire respectively and for automatically lubricating the same between the ends thereof.

In testimony whereof I affix my signature in the presence of two witnesses.

CHARLES H. PETERSON.

Witnesses:
L. L. MARKEL,
HEATH SUTHERLAND.